(12) United States Patent
Kobako (10) Patent No.: US 8,339,684 B2
(45) Date of Patent: Dec. 25, 2012

(54) IMAGE READING DEVICE AND IMAGE READING METHOD

(75) Inventor: Masahiko Kobako, Kahoku (JP)

(73) Assignee: PFU Limited, Kahoku-shi (JP)

( * ) Notice: Subject to any disclaimer, the term of this patent is extended or adjusted under 35 U.S.C. 154(b) by 487 days.

(21) Appl. No.: 12/630,342

(22) Filed: Dec. 3, 2009

(65) Prior Publication Data

US 2010/0165419 A1 Jul. 1, 2010

(30) Foreign Application Priority Data

Dec. 26, 2008 (JP) ................... 2008-333161

(51) Int. Cl.
*H04N 1/04* (2006.01)

(52) U.S. Cl. ......... 358/474; 358/513; 358/514; 382/275

(58) Field of Classification Search .......... 358/474, 358/513, 514, 512, 505; 382/167, 254, 275
See application file for complete search history.

(56) References Cited

U.S. PATENT DOCUMENTS

| 4,516,174 | A | * | 5/1985 | Kammoto | 358/446 |
| 4,875,104 | A | * | 10/1989 | Kamon | 358/400 |
| 6,873,728 | B2 | * | 3/2005 | Bernstein et al. | 382/163 |
| 7,751,642 | B1 | * | 7/2010 | Persson | 382/266 |
| 7,764,412 | B2 | * | 7/2010 | Someya et al. | 358/525 |
| 7,773,255 | B2 | * | 8/2010 | Yagishita | 358/1.9 |
| 7,847,838 | B2 | * | 12/2010 | Ooishi | 348/241 |
| 7,952,770 | B2 | * | 5/2011 | Ikeno et al. | 358/461 |
| 7,970,164 | B2 | * | 6/2011 | Nakamura et al. | 382/100 |
| 7,986,850 | B2 | * | 7/2011 | Hohda et al. | 382/254 |
| 8,121,430 | B2 | * | 2/2012 | Corcoran et al. | 382/254 |
| 8,121,470 | B2 | * | 2/2012 | Kawanishi | 396/121 |
| 8,131,099 | B2 | * | 3/2012 | Hohda et al. | 382/254 |

FOREIGN PATENT DOCUMENTS

| JP | 06-311411 A | 11/1994 |
| JP | 2001-016405 A | 1/2001 |
| JP | 2001-307084 A | 11/2001 |
| JP | 2005-071210 A | 3/2005 |
| JP | 2007-173946 A | 7/2007 |
| JP | 2007-188304 A | 7/2007 |

OTHER PUBLICATIONS

Office Action issued May 29, 2012 in corresponding Japanese Patent Application No. 2008-333161. English translation.

* cited by examiner

*Primary Examiner* — Negussie Worku (74) *Attorney, Agent, or Firm* — Westerman, Hattori, Daniels & Adrian, LLP (57) ABSTRACT

An image reading device 1 includes an output acquiring unit 21 acquiring outputs from a plurality of light receiving elements 17 arranged to form an image reading surface for reading an image of an original, a difference detecting unit 22 detecting edges in the original or an end portion of the original on the basis of the outputs from at least some of the light receiving elements 17 in the outputs acquired by the output acquiring unit 21, and an image information generating unit 23 generating the image information of the original by use of the outputs from the plurality of light receiving elements 17 when the difference detecting unit 22 detects the edges or the end portion of the original.

15 Claims, 8 Drawing Sheets

| IMAGE INFORMATION IDENTIFYING INFORMATION (IMAGE FILE NAME) | PARTIAL IDENTIFYING INFORMATION |
|---|---|
| image01.tif | a |
| image02.tif | b, c |
| image03.tif | c, d |

IMAGE READING DEVICE AND IMAGE READING METHOD

CROSS-REFERENCE TO RELATED APPLICATION

This application is based upon and claims the benefit of priority of the prior Japanese Patent Application No. JP2008-333161, filed on Dec. 26, 2008, the entire contents of which are incorporated herein by reference.

FIELD

The present invention relates to an image reading device and an image reading method.

BACKGROUND

There has hitherto been an image reading device (refer to Patent document 1) which detects that an original is close-fitted to a sheet-like scanner by use of a pressure sensor and permits an image thereof to be read. Further, another image reading device (refer to Patent document 2) is that a pressure applied to a transparent plate is detected by employing the pressure sensor, and, just when the detected pressure reaches a predetermined value, a read of a fingerprint is started. Still another image reading device is an optical information reading device (refer to Patent document 3) in which a buffer material is provided around a reading port, and, when a mobile phone is detected by the pressure sensor disposed at the buffer material, the read of the optical information is started.

[Patent Document 1]
Japanese Patent Laid-Open Publication No. 2007-173946
[Patent Document 2]
Japanese Patent Laid-Open Publication No. 2005-71210
[Patent Document 3]
Japanese Patent Laid-Open Publication No. 2007-188304

SUMMARY

A sheet-like scanner has hitherto been proposed, which is capable of reading the whole original by arranging light receiving elements in two-dimensional matrices without using a driving device for feeding the original or moving a reader. This type of scanner does not include a focus adjusting mechanism, and it is therefore required that the original be made well proximal to the light receiving elements by close-fitting the original to, e.g., a reading surface in order to obtain an in-focus clear-and-sharp image.

Herein, the conventional image reading device adopts a method of determining a close-fitted state of the original based on the pressure detected by use of the pressure sensor and grasping timing for reading the clear-and-sharp image.

In this type of method, however, the close-fitted state of the original is determined based on the pressure, and hence there is such a case that it can not be precisely determined whether the original is actually in a suitable-for reading state or not. Further, in the sheet-like scanner requested to have the close-fitted state of the original, since the pressure sensor is disposed within the sheet, a part of an imaging sensor is replaced by the pressure sensor, and a complementing process is required to be executed based on an output of the ambient imaging sensor with respect to pixels that can not be imaged due to the replacement thereof (refer to Patent document 1).

It is an object of the present invention, which was devised in view of the problems described above, to detect more precisely that the original reaches the suitable-for reading state.

The present invention, in order to solve the problems described above, makes it feasible to detect more precisely that the original reaches the suitable-for reading state by sampling an image of the original during an operation of reading the original and detecting an in-focus point of time.

Specifically, the present invention is an image reading device including: an output acquiring unit to acquire outputs from a plurality of light receiving elements arranged to form an image reading surface for reading an image of an original; a difference detecting unit to detect detecting that a predetermined or higher level of difference exists between the outputs from at least some of the light receiving elements in the outputs acquired by the output acquiring unit; and an image information generating unit to generate the image information of the original by use of the outputs related to the detection or the outputs acquired within a predetermined period of time since the detection thereof from the plurality of light receiving elements when the difference detecting unit detects the predetermined or higher level of difference.

The image reading device according to the present invention is an image reading device which generates the image information by obtaining the outputs from the plurality of light receiving elements arranged to form the image reading surface. The present invention, in this type of image reading device, has a scheme of reading the original by determining, in the case of detecting a difference equal or higher level of difference between the outputs given from some of the light receiving elements, that the original reaches the suitable-for reading state in which the original is well proximal to the image reading surface. Herein, "some of the light receiving elements" may be, e.g., some light receiving elements that are consecutive in a scan direction and may also be the light receiving elements arranged at a predetermined interval (skipping the light receiving elements that are not output acquiring target elements) in the consecutive light receiving elements.

Moreover, the image information generated by the image information generating unit may be the image information based on the outputs just when the difference becomes the predetermined or higher level of difference and may also be the image information based on the outputs acquired within a predetermined period of time since the difference has become the predetermined or higher level of difference. Namely, the image information generating unit may generate the image information by making use of the outputs as they are, which are used when the difference detecting unit detects the difference, and may also generate the image information by utilizing the outputs that are newly acquired after the difference detecting unit has detected the difference. It is, however, preferable that in the case of generating the image information by newly acquiring the outputs from the light receiving elements, the outputs for generating the image information are acquired within a predetermined period of time that is well short to such a degree that the state of the original does not change from the suitable-for reading state after detecting the difference.

Note that the light receiving elements are arranged in, for example, the two-dimensional matrices on the image reading surface directed to the original in order to read the image of the original, however, this arrangement does not imply that all of the light receiving elements are arranged in the two-dimensional matrices completely on the single surface. Further, the image reading surface may not be flat. The image reading surface may be a curved surface matching with a curved surface of the original in order to read the bound original and may also be a curved surface enabling a curvature to change corresponding to the curved surface of the original. Moreover, the image reading surface may be made sufficiently proximal to the surface of the original having a more complicated shape by forming a shape of the sheet in which the light receiving elements are arranged.

Further, the difference detecting unit may detect the predetermined or higher level of difference by detecting at least any one of such conditions that the outputs from some of the light receiving elements contain the output which crosses a predetermined threshold value, that the outputs from some of the light receiving elements contain the output of which a gradient becomes equal to or larger than a predetermined gradient and that the outputs from some of the light receiving elements contain the output with an output difference equal to or larger than a predetermined difference.

The outputs from some of the light receiving elements are compared with these criteria, thereby making it possible to determine whether the original reaches the suitable-for reading state or not. Moreover, in the case of taking the criterion that the output crosses the predetermined threshold value and the criterion that the output difference becomes the predetermined or higher level of difference, it is preferable that some of the light receiving elements from which the outputs are acquired are proximal to the original to such a degree as to determine that the original is clearly read. Namely, in the sufficiently proximal light receiving elements, when the output crosses the predetermined threshold value and when the output difference becomes the predetermined or larger level of difference, it can be determined that the original is clearly read.

Furthermore, the difference detecting unit may detect the predetermined or larger level of difference on the basis of the difference between the outputs related to a border represented on the original in the outputs acquired by the output acquiring unit.

Herein, the border represented on the original is a portion where a color changes conspicuously (intermittently) over a certain border such as a character, a frame line and a line of an illustration represented in the original. For example, if a black character is printed on the original of which a ground color (base color) is white, there is a portion in which the color transitions to black from white while scanning the original. According to the present invention, it is determined based on the difference between the outputs given from the light receiving elements at that border whether or not the original is clearly read.

Moreover, the image reading device according to the present invention may further include an original presser unit to press the original so that the original is close-fitted to the image reading surface, wherein the surface, directed to the image reading surface, of the original presser unit may have a color different from the color of the original, and the difference detecting unit may detect the predetermined or higher level of difference on the basis of a difference between the output related to an end portion of the original and an output related to the original presser unit in the outputs acquired by the output acquiring unit.

Furthermore, the image reading device according to the present invention may further include a light source directed to the image reading surface from behind the original, wherein the difference detecting unit may detect the predetermined or higher level of difference on the basis of a difference between the output related to an end portion of the original and an output related to the light source that is not intercepted by the original in the outputs acquired by the output acquiring unit.

It is feasible to acquire a high output from a region where the original does not exist and a low output from a region where the original exists by providing the light source directed to the image forming surface from behind the original, whereby the end portion of the original can be exactly detected.

Still further, the image reading device according to the present invention may further include a notifying unit notifying a user that the difference detecting unit detects the predetermined or larger level of difference.

The thus-provided notifying unit enables the user to grasp that the original becomes the suitable-for reading state, i.e., grasp the timing of generating the image information of the original. Note that the notification to the user may involve using a method perceptible to the five senses of the user and a notifying method through voice guidance of a buzzer tone in addition to displaying on a display unit.

Yet further, the image reading device may further, the difference detecting unit detecting the predetermined or higher level of difference individually in a plurality of positions on the image reading surface, include: an image information storing unit stored with the image information generated by the image information generating unit at timing when the predetermined or higher level of difference is individually detected in the way of being associated with position identifying information for identifying a position related to the individual detection; and an image information synthesizing unit to synthesize the plural pieces of image information stored by the image information storing unit so that there is left the position specified by the position identifying information associated therewith in the respective pieces of image information.

The differences are individually detected in the plurality of positions, and the image information generated on a per-detection basis is stored in the way of being associated with the position in which the difference is detected, whereby the images each having a preferable state can be acquired in the plurality of positions of the original. According to the present invention, the images in the plurality of positions of the original are synthesized, whereby the preferable image information can be acquired on the whole.

Moreover, the image reading device according to the present invention may further include a notifying unit to notify the user in each detection-related position that the difference detecting unit detects the predetermined or larger level of difference individually. The difference is individually detected in each being-detected position, thereby making it possible to grasp which position of the original is not suited to the read. Further, the image reading device according to the present invention can prompt the user to perform such an operation as to get the original more proximal to the original reading surface by getting the user to grasp which position is not suited to the read.

Moreover, the notifying unit may notify the user in every plurality of positions that the difference detecting unit detects the predetermined or larger level of difference by use of a display unit provided in a position, corresponding to a position just above the position where the predetermined or larger level of difference is detected in the plurality of positions on the image reading surface, of the original presser unit.

This contrivance enables the user to intuitively grasp the position in which the operation of getting the original more proximal to the original reading surface should be done, e.g., a position in which the original presser unit should be pressed with stronger pressure.

Further, the present invention can be grasped by way of an image reading method. For example, the present invention is an image reading method of executing: acquiring outputs from a plurality of light receiving elements arranged to form an image reading surface for reading an image of an original; detecting that a predetermined or higher level of difference exists between the outputs from at least some of the light receiving elements in the outputs acquired in said acquiring; and generating the image information of the original by use of the outputs related to the detection or the outputs acquired within a predetermined period of time since the detection thereof from the plurality of light receiving elements when the predetermined or higher level of difference is detected in said detecting.

According to the present invention, it is feasible to detect more precisely that the original becomes the suitable-for reading state.

DESCRIPTION OF EMBODIMENTS

An image reading device and an image reading method according to the present invention will hereinafter be described by way of an embodiment with reference to the drawings.

Figure 1:
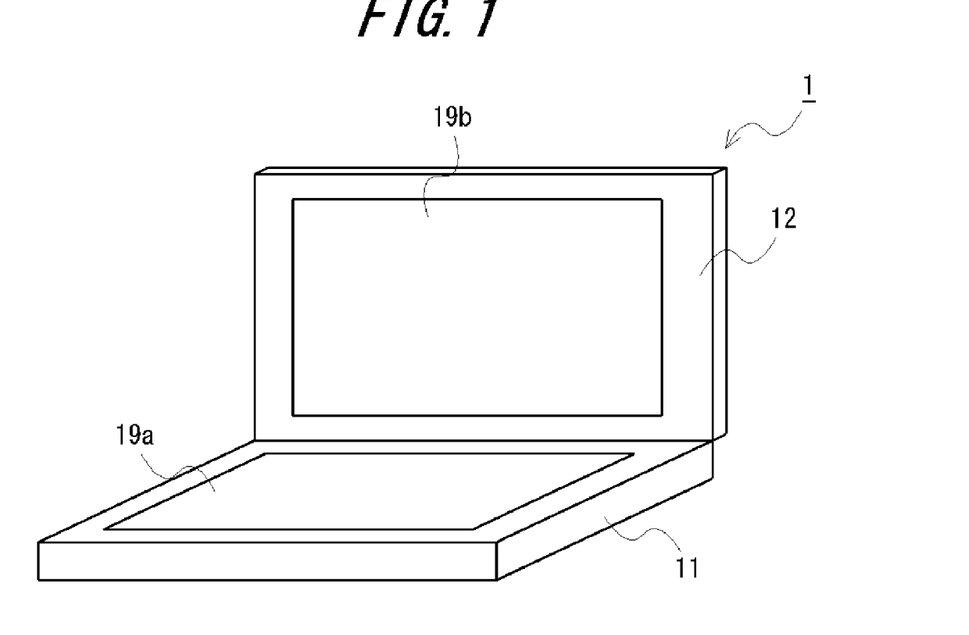
FIG. 1 is a view depicting an external appearance of an image reading device according to an embodiment.

FIG. 1 is a view illustrating an external appearance of an image reading device 1 according to the embodiment. The image reading device 1 includes a body unit 11 having an area sensor 19a on which an original is placed, and a cover unit 12 which is hinged to the body unit 11 and brings the original into close contact with an image reading surface within the area sensor 19a by closely fitting the original to the area sensor 19a in a way that presses down the original placed on the area sensor 19a. Namely, the cover unit 12 functions as an original pressing unit according to the present invention. It should be noted that the image reading device 1 according to the embodiment further includes an area sensor 19b within an internal surface of the cover unit 12 so as to enable both surfaces of the original to be read simultaneously. The original is sandwiched in between the body unit 11 and the cover unit 12, thereby enabling both of a front surface and a back surface of the original to be simultaneously read by the image reading device 1 according to the embodiment. Note that the embodiment is discussed on the assumption that the body unit 11 exists on the side where the body unit 11 is disposed on the table and nearby palms of the user, while the cover unit 12 exists on the side of pressing the original from above with respect to the body unit 11, however, if the area sensor 19b provided on the side of the cover unit 12 reads the image, the body unit 11 functions as the original pressing unit according to the present invention. It is to be noted that the same type of area sensors are introduced into the body unit 11 and the cover unit 12 according to the embodiment. The details (configurations, operations, functions, etc) common to the area sensors 19a and 19b will hereinafter be described by way of an area sensor 19 generically in the embodiment.

Figure 2:
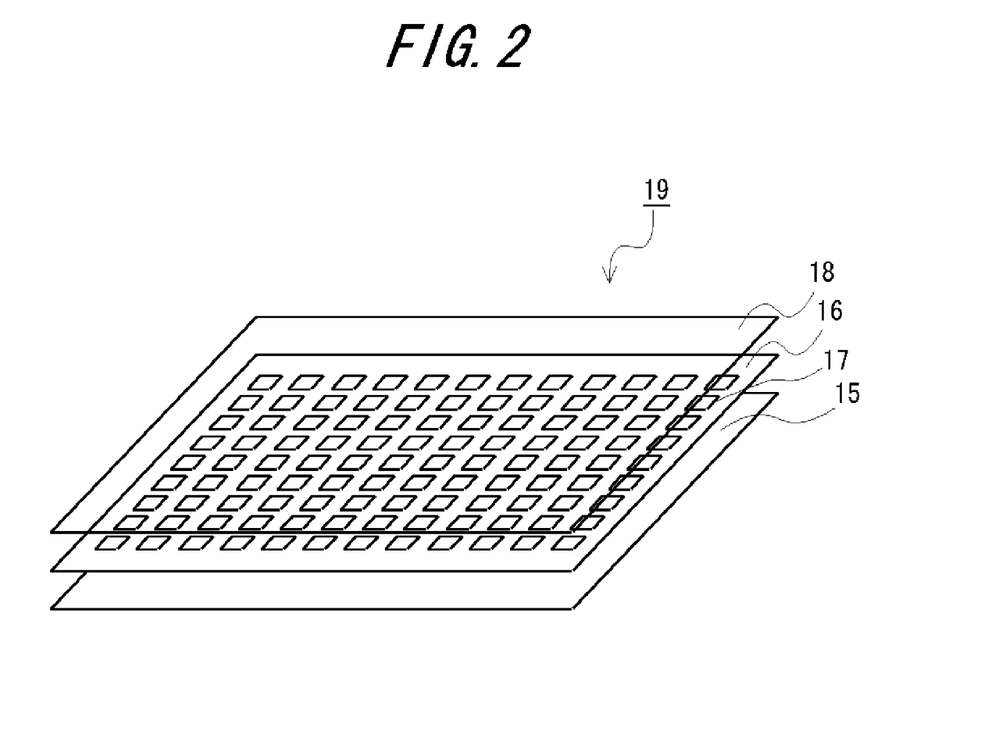
FIG. 2 is a perspective view depicting a configuration of an area sensor introduced into the image reading device according to the embodiment.
Figure 3:
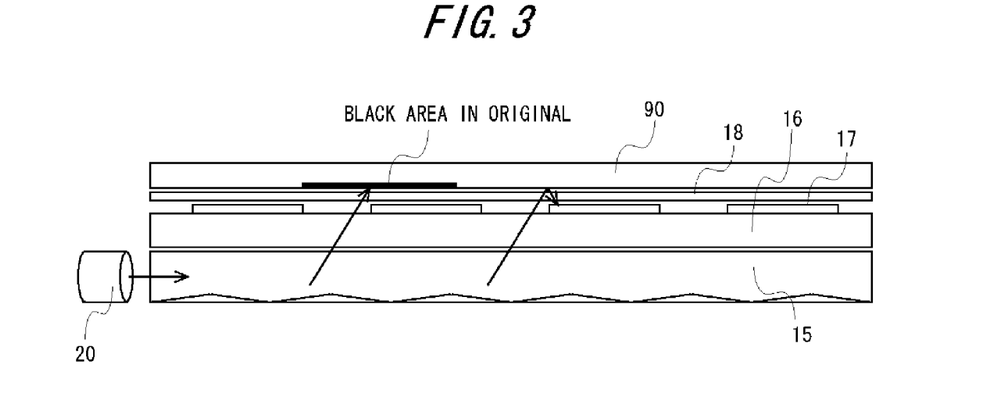
FIG. 3 is a sectional view depicting the configuration of the area sensor introduced into the image reading device according to the embodiment.

FIG. 2 is a perspective view depicting a configuration of the area sensor 19 introduced into the image reading device 1 according to the embodiment. Further, FIG. 3 is a sectional view depicting the configuration of the area sensor 19 introduced into the image reading device 1 according to the embodiment. In the embodiment, the image is read by using the close-fitting type area sensor 19. The area sensor 19 is configured by stacking, sequentially from a lower layer, a light guiding plate 15 for guiding the light incident from an LED (Light Emitting Diode) 20 provided at a side portion of the area sensor 19 to the entire area sensor 19, a glass 16 provided on the light guiding plate 15, light receiving elements 17 (photodiodes) arranged two-dimensionally in matrix at predetermined intervals on the glass 16 to thereby configure the image reading surface and a light transmissive protection sheet 18 for protecting the light receiving elements 17. Note that a light source of the light incident on the light guiding plate 15 involves using the LED in the embodiment, however, other available light sources as this type of light source are exemplified by CCFL (Cold Cathode Fluorescent Lamp) and so on.

The light incident on the light guiding plate 15 from the LED 20 diffuses within the whole light guiding plate 15, thus penetrates the light guiding plate 15 and the glass 16, further penetrates the protection sheet 18 via spaces provided between the light receiving elements 17 and reflects from the original. Moreover, the light reflecting from the original again penetrates the protection sheet 18, and some beams of the penetrating light get incident upon the light receiving elements 17. The light receiving elements 17, when receiving the light, perform an analog output based on photoelectric conversion. The light receiving elements 17 perform the output upon receiving the light reflecting from the original, and hence the outputs obtained herein from the light receiving elements 17 are based on the display of the original proximal to the light receiving elements 17. For example, high outputs are obtained from the light receiving elements proximal to a white area in the original, while low outputs are obtained from the light receiving elements 17 proximal to a black area in the original (see arrowheads in FIG. 3).

The image reading device 1 according to the embodiment, because of introducing the area sensor 19 such as this, can read the whole original substantially simultaneously without involving a feed of the original or a movement of the reading device (with respect to the arrangement of the light receiving elements 17 and the control of the electronic components receiving the outputs from these light receiving elements 17, however, the scan sequence itself over the entire original may exist).

Figure 4:
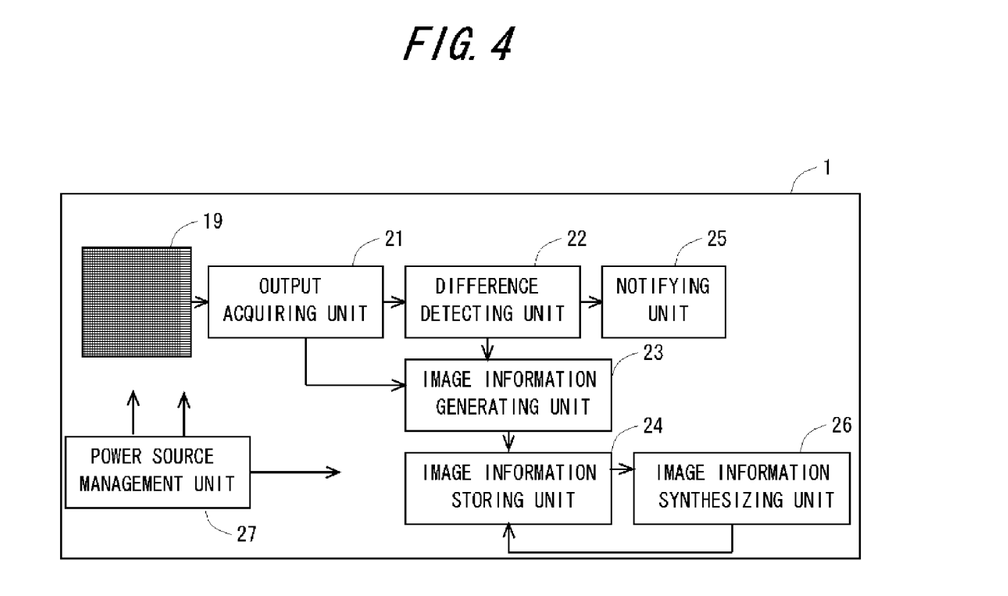
FIG. 4 is a diagram illustrating an outline of a configuration of the image reading device according to the embodiment.

FIG. 4 is a diagram illustrating an outline of the configuration of the image reading device 1 according to the embodiment. The image reading device 1 includes a power source management unit 27 which manages ON/OFF of the power source of the image reading device 1, the close-fitting type area sensor 19 in which the light receiving elements (photodiodes) 17 are arranged to form the image reading surface, an output acquiring unit 21 which acquires the outputs from the light receiving elements 17 arranged in the area sensor 19, a difference detecting unit 22 which detects an edge (border) in the original on the basis of the outputs from a part of the light receiving elements 17, which will be explained later on, in the outputs acquired by the output acquiring unit 21, an image information generating unit 23 which generates image information of the original by use of the outputs acquired by the output acquiring unit 21, an image information storing unit 24 stored with the generated image information, an image information synthesizing unit 26 which synthesizes the stored images, and a notifying unit 25 which notifies the user of a difference detected state detected by the difference detecting unit 22.

The image reading device 1 according to the embodiment is an information processing device including, in addition to the area sensor 19, a converter for converting and sampling the outputs from the area sensor 19, a processor for processing the edge detection and the generation of the image information on the basis of the acquired outputs, a main storage device for developing a program executed by the processor, an auxiliary storage device such as an EEPROM (Electrically Erasable and Programmable Read Only Memory) stored with programs for generating the image information and detecting the edge, the generated image information, an image information table, etc, and a power source for supplying the electric power for operations to these components (the image reading device 1 according to the embodiment is a portable type image reading device drivable by a battery), and the respective units included in the image reading device 1 are realized by the processors executing the programs developed on the main storage device. Note that the processors used for realizing the individual units may be general-purpose processors and may also be dedicated processors for actualizing functions of the respective units.

The power source management unit 27 starts, when the cover unit 12 is opened by the user's operation from a power OFF-state where the cover unit 12 is closed, supplying the power to the image reading device 1 in synchronization with this opening operation. Namely, a startup of the image reading device 1 according to the embodiment is triggered only by opening the cover unit 12 from the power OFF-state, which leads to an original-readable-state. Therefore, the user simply performs the operations of opening the cover unit 12, then placing the original on the area sensor 19 and pressing down the original with the cover unit 12, whereby the image reading device 1 can be made to read the original. Further, the power source management unit 27 may, subsequently after the final image information (e.g., synthesized image information which will be described later on) for use of the user is generated and stored in the auxiliary storage device, automatically finish supplying the power to the image reading device 1. The automatic power OFF at the end of reading the image enables consumption of the battery to be restrained when driven by the battery. The image reading device 1 may, however, be separately provided with a power button for enabling the user to explicitly specify the power ON/OFF timing.

The output acquiring unit 21 converts (sampling) the analog outputs from the light receiving elements 17 into digital outputs Some proportion, to be used for detecting the edge, of the converted outputs are transmitted to the difference detecting unit 22.

Figure 5:
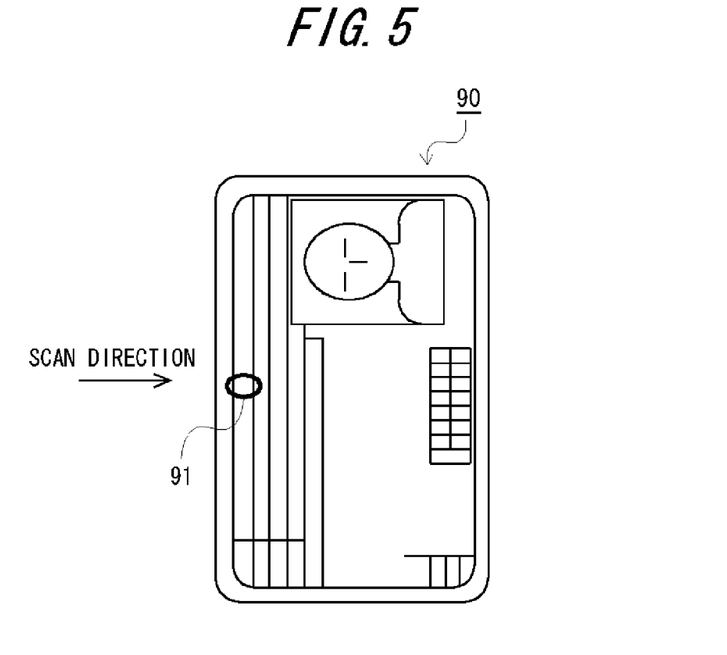
FIG. 5 is a diagram illustrating a license defined as a reading target original by the image reading device according to the embodiment.

The difference detecting unit 22 detects the edge by detecting a predetermined or higher level of difference in the outputs from some of light receiving elements 17. FIG. 5 is a diagram illustrating a license as the reading target original in the image reading device 1 according to the embodiment. An original 90 such as the license contains representations of frame lines, characters, etc as in a portion encircled by a bold line in FIG. 5. The frame lines, the characters, etc are represented so that a color thereof conspicuously (or intermittently) changes against the ground color (base color) of the original 90 when over a certain border. Note that a photo, an illustration, etc displayed in the original include portions (positions) where the color conspicuously changes when over a certain border, however, it is generally difficult to predict which position the border appears in with respect to the photo, the illustration, etc, so that if the original 90 contains a fixed shape of reading target, it is preferable that the position where the frame line etc invariably appears in the original 90 is preset as an edge detecting position 91 (edge detecting target position). In the embodiment, a predetermined line in the license is set as the edge detecting target.

Figure 6:
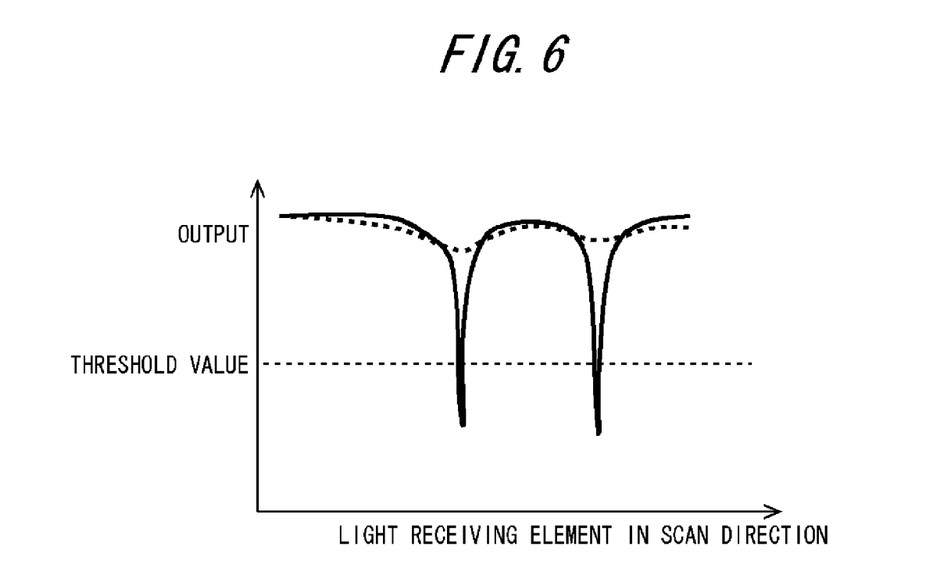
FIG. 6 is a graph representing sampling results of outputs from some of the light receiving elements arranged consecutively in a scan direction in an edge detecting position according to the embodiment.

FIG. 6 is a graph representing a sampling result of the outputs from some of the light receiving elements 17 arranged consecutively in a scan direction with respect to the edge detecting position 91. In the image reading device 1 according to the embodiment, the scan direction of the area sensor 19 is set in such a direction as to traverse the frame line represented in the original 90 in the state where the original 90 as depicted in FIG. 5 is placed on the area sensor 19. In a curve of the graph, a broken line represents the outputs in a case where the original 90 is apart from the image reading surface, while a solid line represents the outputs in a case where the original 90 becomes proximal to the image reading surface. According to the graph depicted in FIG. 6, if the original 90 is apart from the image reading surface (in the case of the broken line), the edge (two line segments encircled by the bold circle in FIG. 5) is not detected from within the original 90, and it is understood that only the outputs in a so-called fuzzy state are obtained. By contrast, if the original 90 becomes sufficiently proximal to the image reading surface (in the case of the solid line), the edge (two line segments encircled by the bold circle in FIG. 5) is detected from within the original 90, and it is comprehended that the outputs in a so-called in-focus state are obtained.

Namely, the scheme of the image reading device according to the embodiment is that the state of the original 90 is monitored and the state suited to the reading is detected by making use of the function peculiar to the area sensor 19 such as the capability of continuously acquiring the outputs from the light receiving elements 17 with respect to at least a part of the original 90. It is to be noted that according to the embodiment, the edge is detected by detecting that the outputs from some of the light receiving elements 17 arranged consecutively in the scan direction cross a predetermined threshold value. To be specific, if the outputs from the sufficiently proximal light receiving elements 17 cross the predetermined threshold value, it can be determined that the color of the content displayed in the original 90 conspicuously (or intermittently) changes among the light receiving elements 17 corresponding to the edge detecting position 91, and therefore the embodiment adopts this change as an edge (border) detection criterion.

Figure 7:
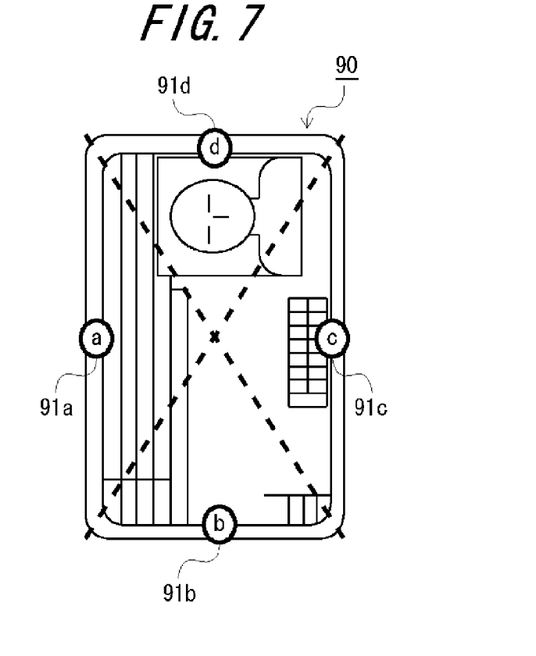
FIG. 7 is a diagram illustrating the edge detecting positions according to the embodiment.

FIG. 7 is a view depicting edge detecting positions 91a, 91b, 91c, 91d according to the embodiment. In the embodiment, the difference detecting unit 22 detects the edges in the predetermined four edge detecting positions 91a, 91b, 91c, 91d on the image reading surface. Note that the image reading device 1 according to the embodiment is applied mainly to the read of the license, and hence dimensions of the image reading surface and of the area sensor 19 are substantially the same as the size of the license, in which when the license is placed as the original 90, regions suitable for detecting the edges of the license are to be set in positions corresponding to the edge detecting positions 91a, 91b, 91c, 91d set in the vicinities of four sides of the image reading surface. Further, herein, the edges are to be detected based on the frame lines vicinal to the four sides of the license.

Figure 8:
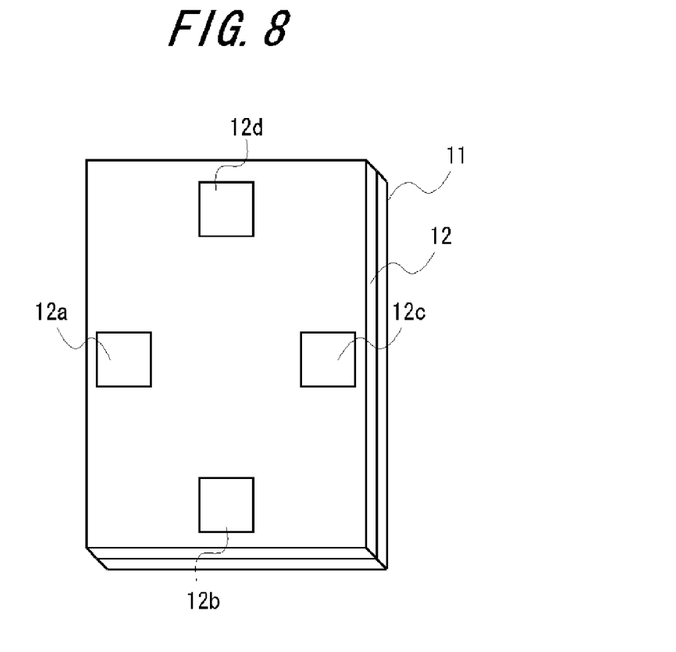
FIG. 8 is a view depicting display units provided in the image reading device according to the embodiment.

The notifying unit 25 notifies the user that the difference detecting unit 22 has detected the edges. In the embodiment, the user is notified of the edge detection through display units 12a, 12b, 12c, 12d provided on the upper surface of the cover unit 12. FIG. 8 is a view depicting the display units 12a, 12b, 12c, 12d provided in the image reading device 1 according to the embodiment. In the embodiment, the display units 12a, 12b, 12c, 12d are provided in positions corresponding to those just above the four edge detecting positions 91a, 91b, 91c, 91d of the cover unit 12, and display the edge detected states of the edge detecting positions 91a, 91b, 91c, 91d located just under these display units. The display units 12a, 12b, 12c, 12d respectively have built-in red LEDs and green LEDs, whereby the notifying unit 25 acquiring the edge detected state detected by the difference detecting unit 22 controls the red LEDs to light up in an edge non-detected state and the green LEDs to light up in the edge detected state.

For example, if the edge is detected in the edge detecting position 91a, the display unit 12a changes to green from red in color, thereby enabling the user to grasp that the edge has been detected in the edge detecting position 91a. The operation is the same with other edge detecting positions 91b, 91c, 91d. Therefore, the user, after inserting the original 90 in the image reading device 1, gets the original 90 close-fitted to the area sensor 19 by pressing the cover unit 12 so that each of the four display units 12a, 12b, 12c, 12d lights up once in green. Note that the image information is generated each time the edge is detected in any one of the edge detecting positions, so that the user has no necessity for waiting till the four display units 12a, 12b, 12c, 12d light up in green simultaneously.

The image information generating unit 23, upon receiving the outputs from the light receiving elements 17, generates the image information. Herein, the image information generating unit 23, unlike the difference detecting unit 22 which detects the edges on the basis of the outputs from some of the light receiving elements 17, generates the image information by receiving the outputs from the entire light receiving elements 17. More specifically, the image information is generated by sampling the outputs from all of the light receiving elements 17 and arranging the sampling results as the image information in such a way that the output from one light receiving element 17 corresponds to one pixel. On the occasion of generating the image information, however, a complementing process based on the outputs from the light receiving elements 17 is executed, and thus the image information having a higher resolution than the light receiving element 17 has (i.e., the image information consisting of the larger number of pixels than the number of the light receiving elements 17) may also be generated. Moreover, the thus-generated image information, though the image information organized by arranging non-compressed pieces of image information in sequence is available, may be compressed by a predetermined reversible or irreversible compression method such as a JPEG (Joint Photographic Experts Group) format and a TIFF (Tagged Image File Format) format.

The image information storing unit 24 stores the generated image information in the auxiliary storage device built in the body unit 11. Upon a trigger that the difference detecting unit 22 detects the edges and the image information generating unit 23 generates the image information, the image information storing unit 24 stores the generated image information in the way of being associated with information from which the edge detecting positions 91 related to the edges detected by the difference detecting unit 22 can be identified.

Figure 9:
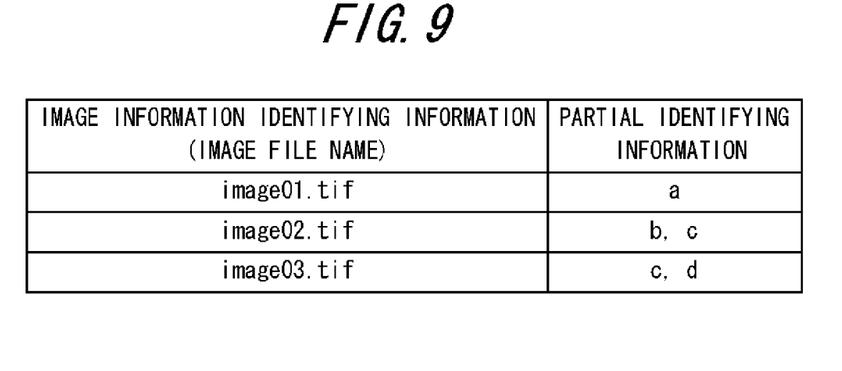
FIG. 9 is a diagram illustrating an image information table according to the embodiment.

FIG. 9 is a diagram illustrating an image information table according to the embodiment. The image information storing unit 24 stores the image information table with a file name of the generated image information and edge detecting position identifying information specifying the edge detecting position 91 related to the edge detection which triggers the generation of the image information associated with the file name, thus associating the image information with the edge detecting positions 91a, 91b, 91c, 91d. A usable technique of associating the image information with the edge detecting positions 91a, 91b, 91c, 91d may be other than tabularization.

Figure 10:
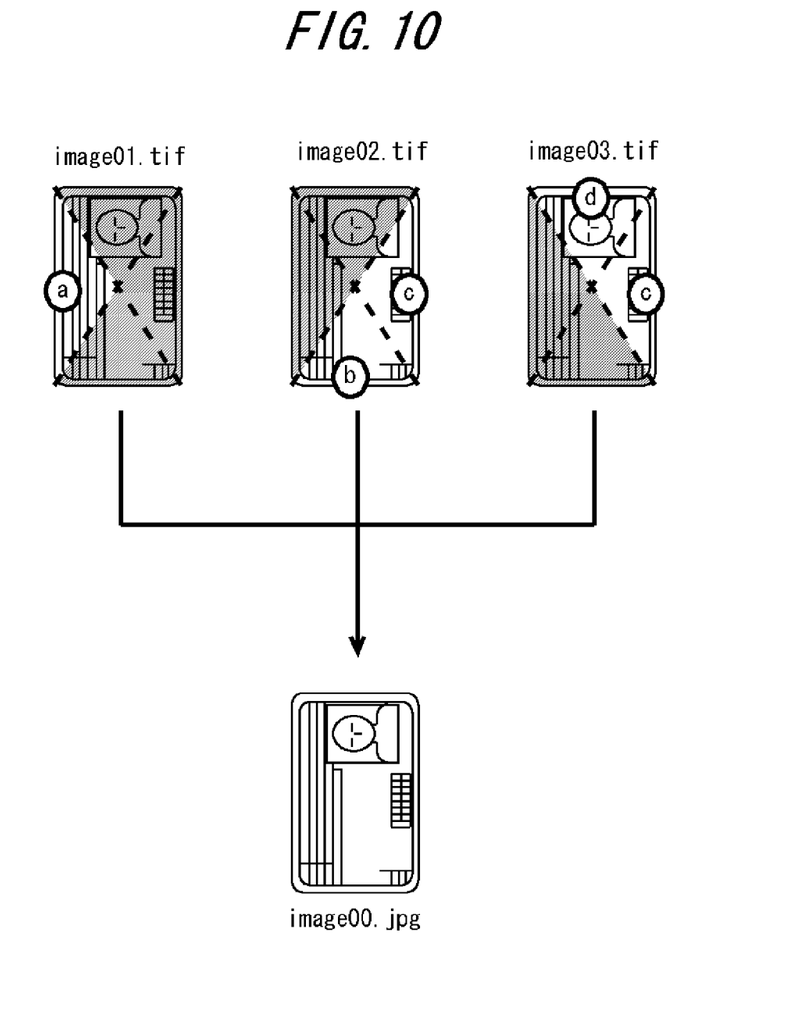
FIG. 10 is a diagram illustrating a method of synthesizing the images by an image information synthesizing unit according to the embodiment.

The image information synthesizing unit 26, when the image information associated with all of the edge detecting positions 91a, 91b, 91c, 91d is generated, synthesizes these pieces of image information, thereby generating a new piece of image information (which is herein referred to as synthesized image information). FIG. 10 is a diagram illustrating an image synthesizing method of the image information synthesizing unit 26 according to the embodiment. The image information synthesizing unit 26 determines the image information adopted for the synthesization from the stored image information by referring to the image information table. Namely, the image information synthesizing unit 26 acquires, from the image information table, the edge detecting position identifying information related to the processing target image information, and adopts, as the image used for the synthesization, an image segment including the edge detecting position 91 associated with the acquired identifying information in four pieces of image segments into which the image is segmented by diagonal lines.

To give a description based on the example illustrated in FIG. 10, a region (image segment) including the edge detecting position 91a is taken from the image information specified by a file name [image01.tif], a region (image segment) including the edge detecting positions 91b, 91c is taken from the image information specified by a file name [image02.tif] and a region (image segment) including the edge detecting positions 91c, 91d is taken from the image information specified by a file name [image03.tif], and these regions are joined together, thereby generating synthesized image information [image00.jpg] (the regions depicted by oblique lines are neither adopted nor used for the synthesization). The synthesized image information is the image information obtained by adopting and synthesizing the in-focus regions in the plural pieces of image information and therefore forms a totally clear-and-sharp image.

Note that if the plural pieces of image information used for the synthesization contain the same region as the region from which the edge is detected (e.g., as illustrated in FIG. 10, plural pieces of adoptable images exist in the region including the edge detecting position 91c), the image information synthesizing unit uses, for synthesization, some images selected at random from within the images in the overlapped regions.

If the same region is included as the region from which the edge is detected, however, the clearer and sharper image in the images in the overlapped regions may also be adopted. For adopting the clearer and sharper image, e.g., the image information table is stored with, in addition to the file name and the edge detecting position identifying information, a contrast on the occasion of detecting the edge (a magnitude of difference between the outputs from the light receiving elements 17 when detecting the edge) in the way of being associated with each other. This scheme enables the image information synthesizing unit 26 to use the image having a higher contrast for the synthesization by referring to the contrasts stored in the image information table. Further, the image information synthesizing unit 26 may simply adopt some of the images stored earlier and the images stored afterward and may synthesize two or more overlapped images in a way that overlays these images.

Note that the synthesization of the image information can involve using a conventional image stitching technique. Further, when synthesizing the image information, the image synthesizing unit 26 may synthesize the image information not by simply joining the images but by referring to the edge (border) such as a straight line within the image and the end portion (edge line) of the original 90 and adjusting the positions to align these elements. Note that according to the image reading device 1 in the embodiment, the image is captured in such a state that the original 90 is sandwiched in between the body unit 11 and the cover unit 12 and the close-fitting to the area sensor 19 is detected from the edge detection, whereby the clear-and-sharp synthesized image information can be acquired without adjusting the positions described above.

Figure 11:
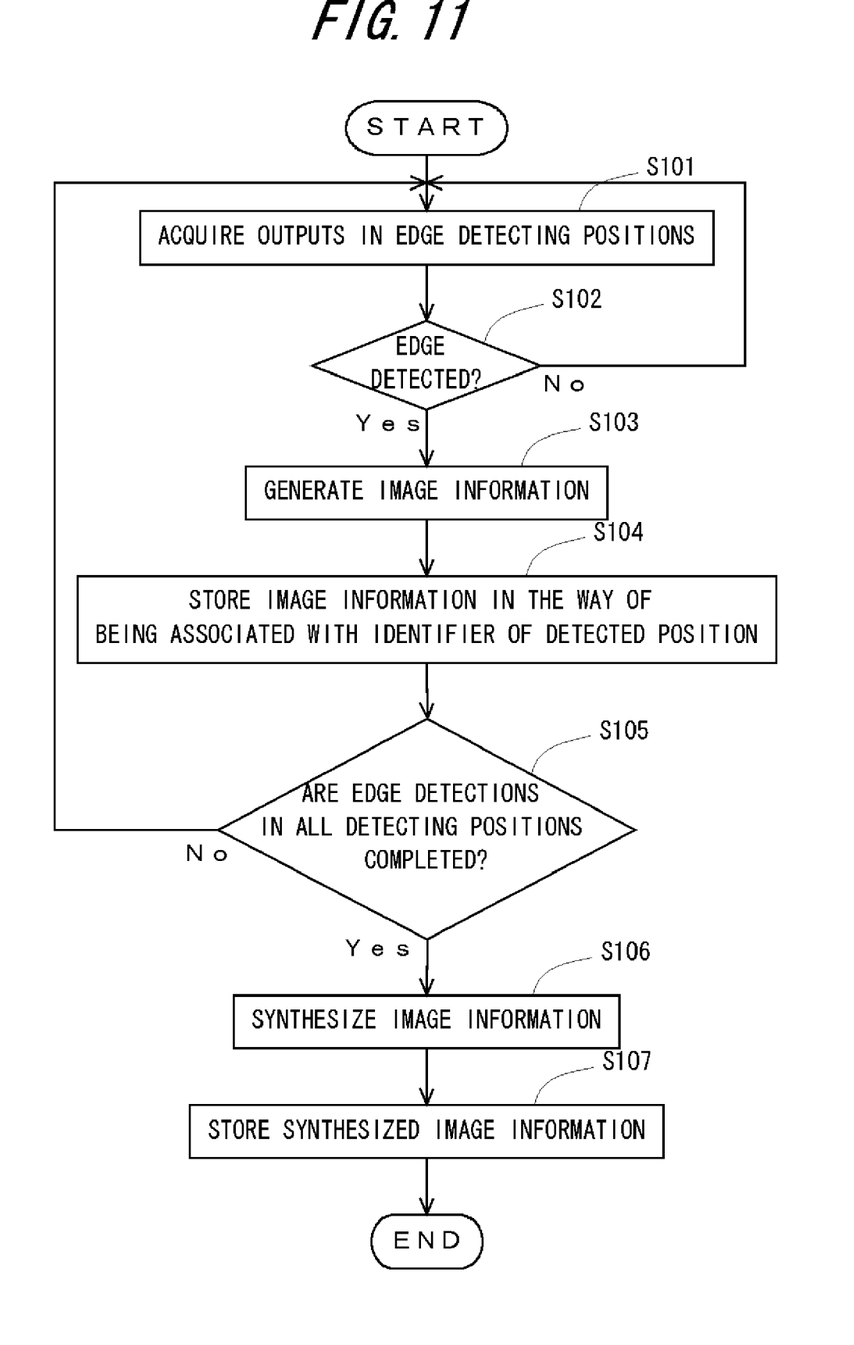
FIG. 11 is a flowchart illustrating a flow of an image reading process according to the embodiment.

FIG. 11 is a flowchart illustrating a flow of the image reading process according to the embodiment. A start of the process illustrated in this flowchart is triggered by opening the cover unit 12 from the power OFF-state through the user's operation and switching ON the power source of the image reading device 1 by the power source management unit 27 in synchronization with this opening operation.

In steps S101 and S102, the outputs from the light receiving elements 17 in the edge detecting positions 91a, 91b, 91c, 91d are acquired, and the edges are thus detected. The output acquiring unit 21 samples the outputs from the light receiving elements 17 arranged corresponding to the edge detecting positions 91a, 91b, 91c, 91d in the light receiving elements 17 within the area sensor 19 (step S101). Then, the difference detecting unit 22 refers to the outputs sampled with respect to the four edge detecting positions 91a, 91b, 91c, 91d, and determines whether or not the output crosses the threshold value in any one of the edge detecting positions 91a, 91b, 91c, 91d (in other words, it is determined whether or not the output over the threshold value and the output under the threshold value exist simultaneously within the outputs related to the single edge detecting position), thereby detecting the edge (step S102).

If the edge is detected in any one of the edge detecting positions 91a, 91b, 91c, 91d, the processing proceeds to step S103. Whereas if the edge is not detected, the processing proceeds to step S101. Namely, the processes given in steps S101 and S102 are repeatedly executed till the edge is detected in any one of the edge detecting positions 91a, 91b, 91c, 91d.

In step S103, the image information at a point of time when detecting the edge is generated. The image information generating unit 23, upon a trigger that the edge is detected in step S102, generates the image information at the point of time when detecting the edge. More specifically, the image information generating unit 23, when grasping that the edge is detected in any one of the edge detecting positions 91a, 91b, 91c, 91d, gets the output acquiring unit 21 to sample (acquire) the outputs from all of the light receiving elements 17, and thus generates the image information on the basis of the acquired outputs from all of the light receiving elements 17. The image information generated herein is the information organized by arranging the pieces of image information acquired from the light receiving elements 17 disposed on the image reading surface, i.e., represents the image of the original 90 placed on the area sensor 19.

Herein, the output, used for generating the image information, from the light receiving element 17 may be what is output simultaneously with the output given when the edge is detected and may also be the output acquired newly within a predetermined period of time since the edge detection. If the outputs from the light receiving elements 17 within the predetermined period of time since the edge detection are used for generating the image information, however, it is preferable that this predetermined period of time be well as short as being capable of presuming that the state of the original 90 at the edge detection (which is the state of the original 90 proximal to the image reading surface) does not change after the edge has been detected. When the image information is generated, the processing proceeds to step S104.

In step S104, the image information is stored. The image information storing unit 24 stores, in the auxiliary storage device of the image reading device 1, the image information generated in step S103 in the way of being associated with the edge detecting position 91 related to the edge detection in step S102, which triggers the generation of the image information. For instance, if the edge detection in just-anterior step S102 is the edge detection in the edge detecting position 91a, the image information storing unit 24 stores the image information generated in just-anterior step S103 in the way of being associated with the identifying information specifying the edge detecting position 91a (see FIG. 9). Further, if the edges are simultaneously detected in the two or more edge detecting positions 91, the image information storing unit 24 stores the image information in a way that associates the image information with pieces of identifying information specifying these two or more edge detecting positions 91. Thereafter, the processing proceeds to step S105.

In step S105, it is determined whether or not the detection of the edges in all of the edge detecting positions 91a, 91b, 91c, 91d is completed. The image information synthesizing unit 26 refers to the edge detecting position identifying information stored in the image information table, and thus determines whether or not the edge detection in all of the four edge detecting positions 91a, 91b, 91c, 91d is completed, i.e., whether or not the images each having the highly acceptable state suited to the use for the subsequent image synthesizing process are obtained with respect to the whole regions of the original 90 segmented by 4 with the diagonal lines.

In the case of determining that the edge detection in all of the edge detecting positions 91a, 91b, 91c, 91d is completed, the processing proceeds to step S106. In the case of determining that the edge detection in all of the edge detecting positions 91a, 91b, 91c, 91d is not completed, the processing loops back to step S101. Namely, the processes illustrated in steps S101 through S105 are executed in iteration till the edges in all of the edge detecting positions 91a, 91b, 91c, 91d are detected and the associated pieces of image information are stored.

In steps S106 and S107, the image information is synthesized and stored. The image information synthesizing unit 26, when determining in step S105 that the edge detection in all of the edge detecting positions 91a, 91b, 91c, 91d is completed, reads and synthesizes the pieces of image information stored in the auxiliary storage device, thereby generating the synthesized image information taking the in-focus state on the whole (step S106). A detailed content of how the image information is synthesized is as given in the description of the image information synthesizing unit 26. The image information storing unit 24 stores, in the auxiliary storage device, the image information generated by the image information synthesizing unit 26 as the synthesized image information actually supplied to the user as the reading image of the original 90. Thereafter, the processes illustrated in this flowchart are finished.

The image reading device 1 according to the embodiment is the image reading device 1 which includes the area sensors 19 provided in both of the body unit 11 and the cover unit 12 to thereby enable the both surfaces of the original 90 to be read simultaneously. Therefore, the processes given in the flowchart are executed for the front surface and the rear surface of the original 90 simultaneously or alternately.

The image reading device 1 according to the embodiment has a USB (Universal Serial Bus) terminal (of which an illustration is omitted). The user connects the image reading device 1 via this terminal to a personal computer etc, whereby the user can read the image information stored in the auxiliary storage device within the image reading device 1 from the outside and can thus utilize the image information. The utilization of the stored image information from the outside may be attained via a communication means used mainly for the connection to a peripheral device such as the USB and Bluetooth, and may also be attained in such a way that the image reading device 1 is provided with a memory card slot etc to and from which the storage device itself stored with the synthesized image information is made attachable and detachable.

Incidentally, the scheme of the embodiment is that it is determined by detecting the edges in the original 90 that the original 90 is set in the state suited to the read, however, another available scheme is that it is determined by detecting the end portion (edge line) of the original 90 in place of the edges of the frame lines, the characters, etc in the original 90 that the original 90 is set in the state suited to the read.

Figure 12:
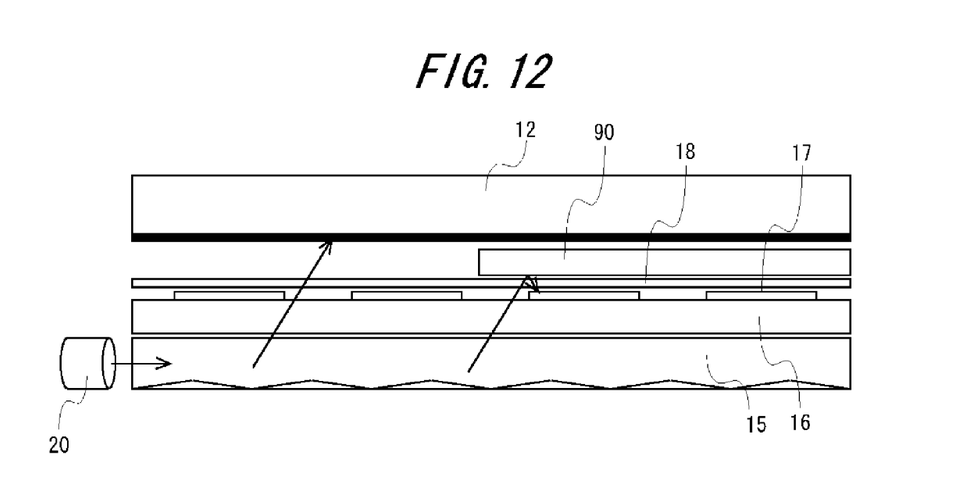
FIG. 12 is a view depicting a section of the image reading device which detects an end portion (edge line) of the original by making use of a contrast of a color of an internal surface of an original presser unit against a base color of the original.

FIG. 12 is a view depicting a section of the image reading device which detects the end portion of the original 90 by making use of a contrast between a color of an internal surface of an original presser unit and the base color of the original 90. The configuration of the area sensor 19 used in the image reading device is substantially the same as the configuration explained with reference to FIGS. 2 and 3 in the embodiment, and hence its description is omitted. In the embodiment, for instance, if the base color of the original 90 assumed to be the reading target is white and if capable of detecting a tangible change of the color at the end portion (edge line) of the original against a black color of the internal surface of the original presser unit, the original 90 becomes proximal to the image reading surface, and it is determined that the state suited to the read of the original occurs. Namely, in such a case, a line position in which the end portion (edge line) of the original 90 is located is set as a position of detecting the end portion of the original.

Note that in the case of providing both of the body unit 11 and the cover unit 12 with the area sensors 19 as in the image reading device 1, the difference detecting units 22 alternately detect the difference, while the LED 20 of the area sensor 19 on a difference non-detecting side is switched OFF, whereby the surface of the area sensor on the difference non-detecting side can be utilized as the internal surface of the original presser unit for detecting the end portion of the original. Normally, the surface of the area sensor is tinged with a dark color against the base color of the original 90 in the OFF-state of the LED 20, and hence the end portion (edge line) of the original can be detected by making use of (the contrast between) the color of the surface of the area sensor with the LED 20 switched OFF and the base color of the original 90.

Figure 13:
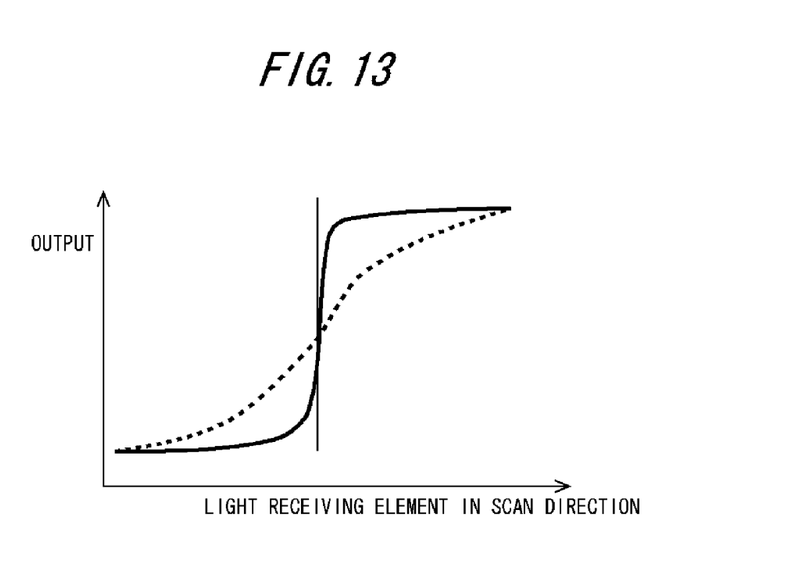
FIG. 13 is a graph representing the sampling results of the outputs from some of the light receiving elements arranged consecutively in the scan direction in the edge detecting position in a state illustrated in FIG. 12.

FIG. 13 is a graph depicting the sampling results of the outputs from some of the light receiving elements 17 arranged consecutively in the scan direction in the detecting position in the state illustrated in FIG. 12. In curves of the graph, a broken line represents the output in a case where the original 90 or the original presser unit is apart from the image reading surface, while a solid line represents the output in a case where the original 90 and the original presser unit get proximal to the image reading surface. According to the graph illustrated in FIG. 13, if the original 90 or the original presser unit is apart from the image reading surface (in the case of the broken line), it is understood that the end portion (edge line) of the original 90 is not detected, and only the output in the so-called fuzzy state is obtained. By contrast, if the original 90 and the original presser unit become well proximal to the image reading surface (in the case of the solid line), it is understood that the end portion (edge line) of the original 90 is detected, and the output in the so-called in-focus state is acquired.

Figure 14:
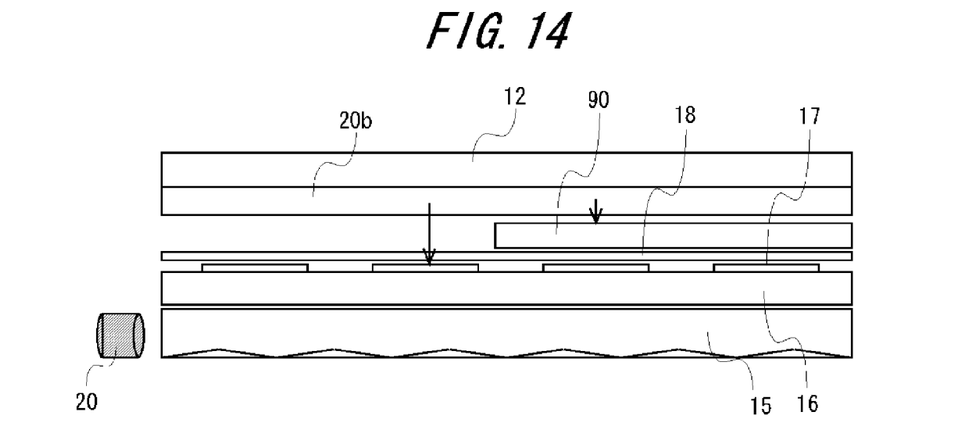
FIG. 14 is a view depicting a section of the image reading device which detects the end portion of the original by making use of a contrast from a region of the original when a light source disposed in the internal surface of the original presser unit and an LED of the area sensor are switched OFF.

FIG. 14 is a view depicting a section of the image reading device which detects the end portion of the original 90 by making use of a contrast from a region of the original when a light source 20b disposed in the internal surface of the original presser unit and the LED of the area sensor 19 are switched OFF. The configuration of the area sensor 19 used in the image reading device is substantially the same as the configuration explained with reference to FIGS. 2 and 3, and therefore its description is omitted. A scheme of the embodiment is that the light source 20b disposed in the internal surface of the original presser unit is switched ON, while the LED 20 provided on the side of the area sensor 19 in which the light receiving elements 17 are arranged is switched OFF, if the tangible change of the color at the end portion (edge line) of the original can be detected, it is determined that the original 90 gets close to the image reading surface, and the state suited to the read of the original occurs. To be specific, the high outputs are, upon receiving the light from the light source 20b disposed in the internal surface of the original presser unit, acquired from the light receiving elements 17 where the original 90 does not exist, while the low outputs are acquired from the light receiving elements 17 in the region where the original 90 exists because of the light from the light source 20b in the internal surface of the original presser unit being intercepted by the original 90 and because of the LED 20 on the side of the area sensor 19 being switched OFF.

Incidentally, in the case of providing both of the body unit 11 and the cover unit 12 with the area sensors 19 as in the image reading device 1, the difference detecting units 22 alternately detect the difference, while the LED 20 of the area sensor 19 on the difference non-detecting side may be employed as the light source 20b in the rear of the reading target surface of the original 90. In this case, the LED 20 of the area sensor 19 set effective in acquiring the outputs from the light receiving elements 17 for detecting the difference, is set in the OFF-state. Thus, as by the image reading device 1 exemplified in the embodiment, the image reading device with the area sensors disposed so as to sandwich the original 90 in therebetween in order to enable the both surfaces of the original 90 to be read, uses one area sensor as the light source 20b behind the original 90 by lighting up the LED 20 of the area sensor and another area sensor as the original reading surface for detecting the end portion of the original by switching OFF the LED 20 of this another area sensor, whereby the end portion of the original can be detected without separately providing any light source for detecting the end portion of the original.

Figure 15:
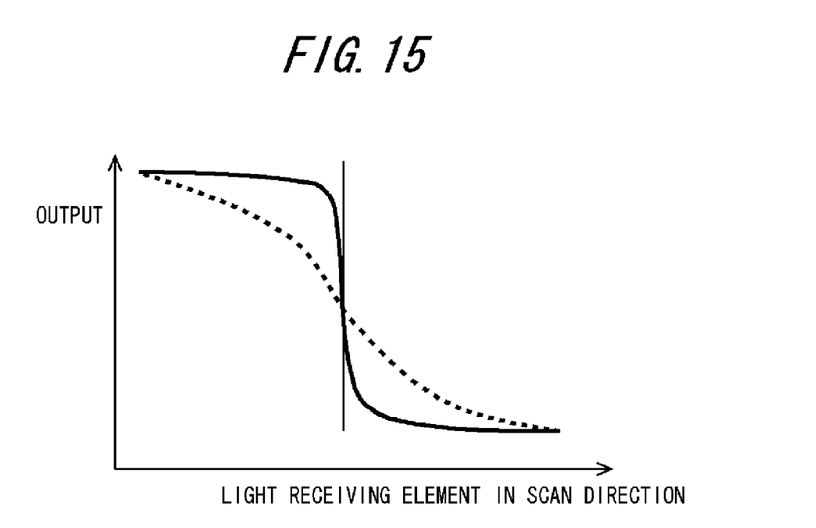
FIG. 15 is a graph representing the sampling results of the outputs from some of the light receiving elements arranged consecutively in the scan direction in the edge detecting position in a state illustrated in FIG. 14.

FIG. 15 is a graph representing the sampling results of the outputs from some of the light receiving elements 17 arranged consecutively in the scan direction in the detecting position in the state illustrated in FIG. 14. In curves of the graph, the broken line represents the output in the case where the original 90 or the original presser unit is apart from the image reading surface, while the solid line represents the output in the case where the original 90 and the original presser unit get proximal to the image reading surface. According to the graph illustrated in FIG. 15, if the original 90 or the original presser unit is apart from the image reading surface (in the case of the broken line), it is understood that the end portion (edge line) of the original 90 is not detected, and only the output in the so-called fuzzy state is obtained. By contrast, if the original 90 and the original presser unit become well proximal to the image reading surface (in the case of the solid line), it is understood that the end portion (edge line) of the original 90 is detected, and the output in the so-called in-focus state is acquired.

In the examples explained with reference to FIGS. 12 through 15, the difference detecting unit 22 detects based on the outputs from the light receiving elements 17 that a gradient ($\Delta V/\Delta pixel$, where V represents the output) of the outputs from some of the light receiving elements 17 arranged consecutively in the scan direction reaches a predetermined level or larger, thereby detecting the edge. According to the graphs illustrated in FIGS. 13 and 15, it is comprehended that the output indicated by the broken line in the graph has a small gradient, while the output indicated by the solid line in the graph has a large gradient. Namely, if the gradient of the series of outputs from the light receiving elements 17 becomes equal to or larger than the predetermined level, it can be determined that the output largely (or intermittently) changes among the light receiving elements 17 corresponding to the detecting position (region), and hence this change serves as a criterion for detecting the end portion of the original in the embodiment.

Note that the embodiment has provided the discussions on how the edge of the original 90 is detected from knowing that the output crosses the predetermined threshold value and on how the end portion of the original is detected based on the output gradient, however, in any case of detecting the edges in the original 90 and detecting the end portion of the original, the determination about whether the original 90 is in the suitable-for-reading state or not may be made by detecting any one or more of such a condition that the output crosses the predetermined threshold value, the gradient of the output and the output difference.

Moreover, the scheme of the embodiment discussed above is that a plurality of detecting target positions for detecting the edge and the end portion of the original is set, and the clear-and-sharp image information as a whole is generated by synthesizing the plural pieces of acquired image information. In contrast with this scheme, such a method may be adopted that after setting the plurality of detecting target positions for detecting the edge and the end portion of the original, and, when the difference detecting unit detects the edges and the end portion (edge line) of the original simultaneously in al of the detecting positions, the image information generating unit generates the clear-and-sharp image information on the whole. Further, another method may also be adopted, which involves setting one detecting target position for detecting the edge and the end portion of the original, and, when the edge and the end portion of the original are detected in this one detecting position, generating the clear-and-sharp image information on the whole by the image information generating unit.

Moreover, in the embodiment, the outputs from the light receiving elements 17 are acquired without providing the pressure sensor, and it is determined whether or not the original 90 is in the suitable-for-reading state; however, the pressure sensor for detecting that the original 90 is pressed against the body unit 11 and is pressed by the original presser unit is separately provided, and a period for which the pressure sensor detects the pressing may be set as a period of the detection by the difference detecting unit 22. With this contrivance, it is feasible to prevent the process of detecting the edge etc from being executed in a way that acquires the outputs from the light receiving elements 17 during the opening of the original presser unit and to restrain the power consumption in the case of being driven by the battery etc.

What is claimed is:

1. An image reading device comprising:
   an output acquiring unit to acquire outputs from a plurality of light receiving elements arranged to form an image reading surface for reading an image of an original;
   a difference detecting unit to detect that at least a predetermined level of difference exists between the outputs from at least some of said light receiving elements in the outputs acquired by said output acquiring unit; and
   an image information generating unit to generate the image information of the original by use of the outputs related to the detection or the outputs acquired within a predetermined period of time since the detection thereof from said plurality of light receiving elements when said difference detecting unit detects at least the predetermined level of difference.

2. An image reading device according to claim 1, wherein the image information generated by the image information generating unit is the image information based on the outputs just when the difference becomes at least the predetermined level of difference, or the image information generated by the image information generating unit is the image information based on the outputs acquired within a predetermined period of time since the difference has become at least the predetermined of difference.

3. An image reading device according to claim 1, wherein said difference detecting unit detects at least the predetermined level of difference by detecting at least any one of such conditions where the outputs from some of said light receiving elements contain the output which crosses a predetermined threshold value, the outputs from some of said light receiving elements contain the output of which a gradient becomes equal to or larger than a predetermined gradient and the outputs from some of said light receiving elements contain the output with an output difference equal to or larger than a predetermined difference.

4. An image reading device according to claim 1, wherein the difference detecting unit detects at least the predetermined level of difference on the basis of the difference between the outputs related to a border represented on the original in the outputs acquired by the output acquiring unit.

5. An image reading device according to claim 1, further comprising:
an original presser unit to press the original so that the original is close-fitted to the image reading surface,
wherein the surface, directed to the image reading surface, of the original presser unit has a color different from the color of the original, and the difference detecting unit detects at least the predetermined level of difference on the basis of a difference between the output related to an end portion of the original and an output related to the original presser unit in the outputs acquired by the output acquiring unit.

6. An image reading device according to claim 1, further comprising:
a light source directed to the image reading surface from behind the original,
wherein the difference detecting unit detects at least the predetermined level of difference on the basis of a difference between the output related to an end portion of the original and an output related to the light source that is not intercepted by the original in the outputs acquired by the output acquiring unit.

7. An image reading device according to claim 1, said difference detecting unit detecting at least the predetermined level of difference individually in a plurality of positions on the image reading surface, further comprising:
an image information storing unit stored with the image information generated by said image information generating unit at timing when at least the predetermined level of difference is individually detected in the way of being associated with position identifying information for identifying a position related to said individual detection; and
an image information synthesizing unit to synthesize the plural pieces of image information stored by said image information storing unit so that there is left the position specified by the position identifying information associated therewith in the respective pieces of image information.

8. An image reading device according to claim 7, further comprising: a notifying unit to notify the user in each detection-related position that the difference detecting unit detects at least the predetermined level of difference individually.

9. An image reading device according to claim 8, wherein the notifying unit notifies the user in every plurality of positions that the difference detecting unit detects at least the predetermined level of difference by use of a display unit provided in a position, corresponding to a position just above the position where at least the predetermined level of difference is detected in the plurality of positions on the image reading surface, of the original presser unit.

10. An image reading method comprising:
acquiring outputs from a plurality of light receiving elements arranged to form an image reading surface for reading an image of an original;
detecting that at least a predetermined level of difference exists between the outputs from at least some of said light receiving elements in the outputs acquired in said acquiring; and
generating the image information of the original by use of the outputs related to the detection or the outputs acquired within a predetermined period of time since the detection thereof from said plurality of light receiving elements when at least the predetermined level of difference is detected in said detecting.

11. An image reading method according to claim 10, wherein the image information generated in said generating is the image information based on the outputs just when the difference becomes at least the predetermined level of difference, or the image information generated in said generating is the image information based on the outputs acquired within a predetermined period of time since the difference has become at least the predetermined level of difference.

12. An image reading method according to claim 10, wherein said detecting involves detecting at least the predetermined level of difference by detecting at least any one of such conditions where the outputs from some of said light receiving elements contain the output which crosses a predetermined threshold value, the outputs from some of said light receiving elements contain the output of which a gradient becomes equal to or larger than a predetermined gradient and the outputs from some of said light receiving elements contain the output with an output difference equal to or larger than a predetermined difference.

13. An image reading method according to claim 10, wherein said detecting involves detecting at least the predetermined level of difference on the basis of the difference between the outputs related to a border represented on the original in the outputs acquired in said acquiring.

14. An image reading method according to claim 10, said detecting involves detecting at least the predetermined level of difference individually in a plurality of positions on the image reading surface, further comprising:
storing the image information generated in said generating at timing when at least the predetermined level of difference is individually detected in the way of being associated with position identifying information for identifying a position related to said individual detection; and
synthesizing the plural pieces of image information stored in said storing so that there is left the position specified by the position identifying information associated therewith in the respective pieces of image information.

15. An image reading method according to claim 14, further comprising:
notifying the user in each detection-related position that said detecting detects at least the predetermined level of difference individually.

* * * * *